US012587725B2

(12) United States Patent

Chou et al.

(10) Patent No.: US 12,587,725 B2

(45) Date of Patent: Mar. 24, 2026

(54) IMAGE CAPTURING DEVICE AND IMAGE CAPTURING METHOD THEREOF

(71) Applicant: HTC Corporation, Taoyuan City (TW)

(72) Inventors: Ching-Chia Chou, Taoyuan City (TW); Chung-Hsiang Chang, Taoyuan City (TW); Tsung-Lin Lu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 122 days.

(21) Appl. No.: 18/533,203

(22) Filed: Dec. 8, 2023

(65) Prior Publication Data

US 2025/0193500 A1      Jun. 12, 2025

(51) Int. Cl.
H04N 23/00      (2023.01)
H04N 23/20      (2023.01)

(52) U.S. Cl.
CPC .................................... H04N 23/20 (2023.01)

(58) Field of Classification Search
CPC ............................... H04N 23/20; H04N 23/56
See application file for complete search history.

(56) References Cited

U.S. PATENT DOCUMENTS

| | | | | |
|---|---|---|---|---|
| 6,459,919 B1 * | 10/2002 | Lys | ........................ | H05B 47/10 |
| | | | | 600/407 |
| 6,919,795 B2 * | 7/2005 | Roseen | ................ | G06Q 10/087 |
| | | | | 340/568.1 |
| 7,604,378 B2 * | 10/2009 | Wolf | ........................ | A61L 9/037 |
| | | | | 362/85 |
| 7,630,776 B2 * | 12/2009 | Harwood | ............... | H04R 27/00 |
| | | | | 455/13.1 |
| 7,638,808 B2 * | 12/2009 | Owen | ................. | H01L 25/0753 |
| | | | | 257/E25.02 |
| 7,903,838 B2 * | 3/2011 | Hudnut | .................... | A47J 37/00 |
| | | | | 382/100 |
| 8,441,534 B2 * | 5/2013 | Hubmer | ............. | G08B 21/0275 |
| | | | | 707/791 |
| 8,690,273 B2 * | 4/2014 | Dolinsek | ............... | F25D 23/065 |
| | | | | 312/401 |
| 8,756,942 B2 * | 6/2014 | Min | ........................ | F25D 29/00 |
| | | | | 62/62 |
| 8,912,905 B2 * | 12/2014 | Wong | ...................... | F21V 14/04 |
| | | | | 340/572.4 |

(Continued)

OTHER PUBLICATIONS

Milesight https://web.archive.org/web/20230327040456/https://www.milesight.com/technology/innovation/smart-ir-ii-technology, Mar. 15, 2023 website print out from wayback machine (Year: 2023).*

(Continued)

*Primary Examiner* — Frank F Huang
(74) *Attorney, Agent, or Firm* — JCIPRNET

(57) ABSTRACT

An image capturing device and an image capturing method thereof are provided. The image capturing device includes a plurality of infrared light sources, an image capturer and a controller. The infrared light sources respectively have a plurality of light types. The image capturer is configured to capture image information. The controller is coupled to the infrared light sources and the image capturer. The controller turns on or turns off each of the infrared light sources according to light intensity information, wherein at least one of the infrared light sources is turned on during an image capturing operation.

10 Claims, 5 Drawing Sheets

100

(56)                References Cited

U.S. PATENT DOCUMENTS

| | | | | |
|---|---|---|---|---|
| 8,935,938 | B2* | 1/2015 | Krause | F25D 23/126 |
| | | | | 62/331 |
| 9,024,716 | B2* | 5/2015 | Yum | G06Q 10/087 |
| | | | | 340/3.7 |
| 9,173,188 | B2* | 10/2015 | Miyawaki | H04W 64/00 |
| 9,357,873 | B2* | 6/2016 | Reyhanloo | A47J 31/4485 |
| 9,412,086 | B2* | 8/2016 | Morse | G06K 7/1417 |
| 9,545,930 | B2* | 1/2017 | Ricci | G01C 21/3484 |
| 2002/0066279 | A1* | 6/2002 | Kiyomatsu | F25D 29/00 |
| | | | | 62/125 |
| 2008/0278324 | A1* | 11/2008 | Uchimura | G01S 5/16 |
| | | | | 340/572.1 |
| 2009/0268023 | A1 | 10/2009 | Hsieh | |
| 2010/0170289 | A1* | 7/2010 | Graziano | F25D 23/02 |
| | | | | 62/449 |
| 2010/0225484 | A1* | 9/2010 | Van De Sluis | G01S 1/7034 |
| | | | | 340/572.4 |
| 2012/0241043 | A1* | 9/2012 | Perazzo | A61J 7/0053 |
| | | | | 141/2 |
| 2014/0043433 | A1* | 2/2014 | Scavezze | G02B 27/0172 |
| | | | | 348/42 |
| 2014/0232866 | A1* | 8/2014 | Lee | H04N 7/18 |
| | | | | 348/143 |
| 2014/0313693 | A1* | 10/2014 | Seo | F25D 27/005 |
| | | | | 362/94 |
| 2014/0320647 | A1* | 10/2014 | Seo | F25D 29/00 |
| | | | | 348/143 |
| 2015/0267960 | A1* | 9/2015 | Cheon | F25D 29/005 |
| | | | | 62/127 |
| 2016/0033194 | A1* | 2/2016 | Sumihiro | F25D 23/04 |
| | | | | 62/125 |
| 2016/0088262 | A1* | 3/2016 | Lee | G06F 3/167 |
| | | | | 704/275 |
| 2023/0050340 | A1 | 2/2023 | Yang et al. | |

OTHER PUBLICATIONS

"Office Action of Taiwan Counterpart Application", issued on Apr. 9, 2024, p. 1-p. 7.

* cited by examiner

130

Controller

111

120

112

100

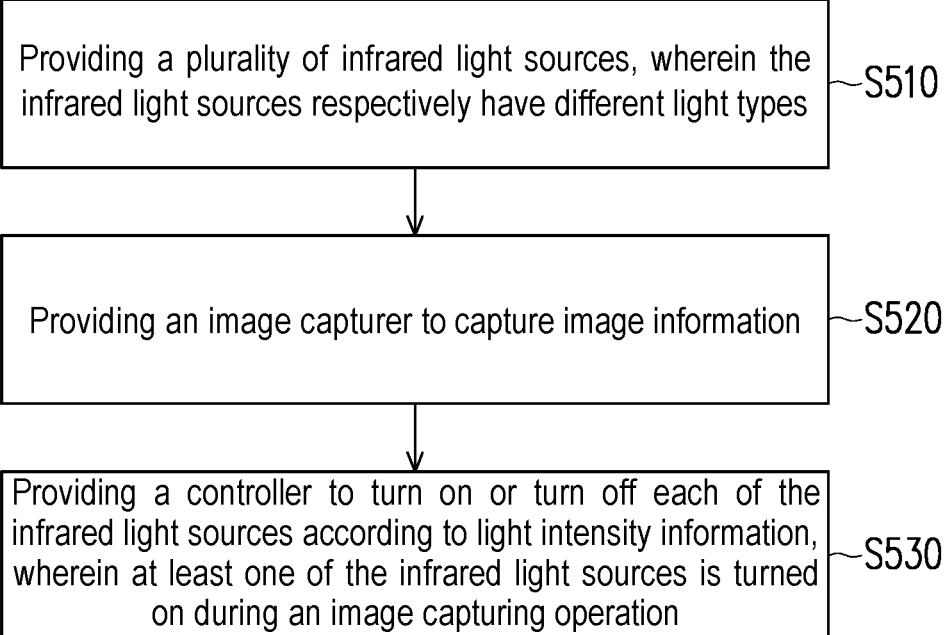

Providing a plurality of infrared light sources, wherein the infrared light sources respectively have different light types — S510

Providing an image capturer to capture image information — S520

Providing a controller to turn on or turn off each of the infrared light sources according to light intensity information, wherein at least one of the infrared light sources is turned on during an image capturing operation — S530

FIG. 5

IMAGE CAPTURING DEVICE AND IMAGE CAPTURING METHOD THEREOF

BACKGROUND

Technical Field

The invention relates to an image capturing device and image capturing method thereof, and in particular, to an image capturing device applied to infrared light images and image capturing method thereof.

Description of Related Art

In order to improve the safety in life, image capturing devices with night vision function are commonly used devices in daily life. In current technology, the body illumination range of image capturing devices with night vision function (such as micro camera) is usually limited to the center of the field of view. The purpose of this setting is to provide a longer illumination distance. However, the surrounding area of the image is often dark and without image in the case of a micro camera with a wide-angle shooting function, and it is impossible to shoot the same field of view as in daylight. Besides, the infrared light sources commonly used in conventional micro cameras are light sources with highly directional light types. Therefore, in the night mode, when the object being shoot is too close, it will cause overexposure of the infrared light illumination, making the captured image uninterpretable.

SUMMARY

The invention provides an image capturing device and image capturing method thereof, which can effectively improve the quality of captured images.

The image capturing device of the present invention includes a plurality of infrared light sources, an image capturer and a controller. The infrared light sources respectively have a plurality of light types. The image capturer is configured to capture image information. The controller is coupled to the infrared light sources and the image capturer. The controller turns on or turns off each of the infrared light sources according to light intensity information, wherein at least one of the infrared light sources is turned on during an image capturing operation.

The image capturing method of the present invention includes: providing a plurality of infrared light sources, wherein the infrared light sources respectively have a plurality of light types; providing an image capturer to capture image information; and providing a controller to turn on or turn off each of the infrared light sources according to light intensity information, wherein at least one of the infrared light sources is turned on during an image capturing operation.

Based on the above, the image capturing device of the present invention sets multiple infrared light sources with multiple different light types, and determines the number of infrared light sources to be turned on according to the light intensity information of the shooting scene. In this way, during the image capturing operation of the infrared images, the infrared light sources with different light types can be activated according to the state of the shooting scene to perform adaptive fill light operations. Furthermore, when the light intensity is too high, some infrared light sources can be turned off to prevent the possibility of overexposure and improve the quality of the captured images.

BRIEF DESCRIPTION OF THE DRAWINGS

FIG. 5 is a flow chart of an image capturing method according to another embodiment of the present invention.

DESCRIPTION OF THE EMBODIMENTS

Figure 1:
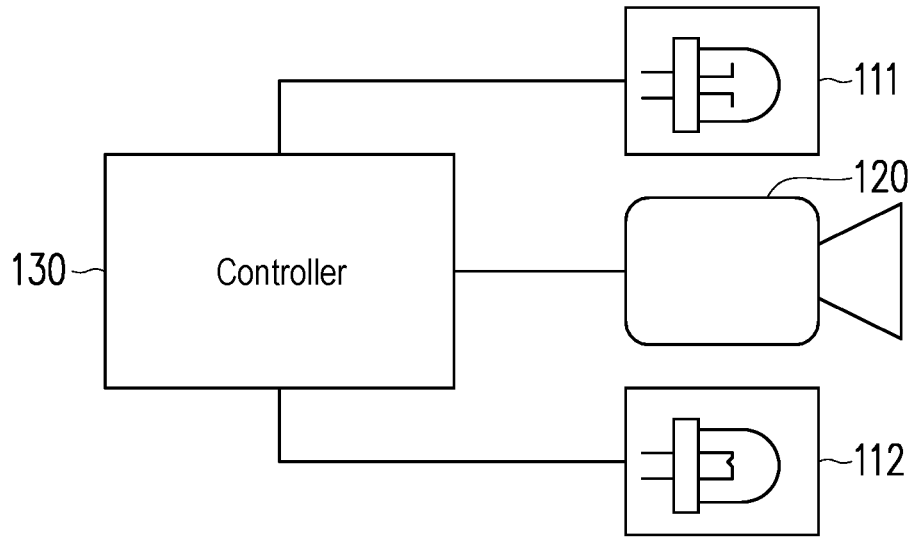
FIG. 1 is a schematic diagram of an image capturing device according to an embodiment of the present invention.

Referring to FIG. 1, FIG. 1 is a schematic diagram of an image capturing device according to an embodiment of the present invention. The image capturing device 100 can have night vision function. The image capturing device 100 includes a plurality of infrared light sources 111, 112, an image capturer 120 and a controller 130. The infrared light sources 111, 112 can respectively have different light types. Furthermore, the infrared light sources 111, 112c can respectively have different light beam transmission ranges. For example, the infrared light source 111 can be an infrared light emitting diode (IR LED) with wide-angle light type, and the infrared light source 112 can be an infrared light emitting diode with highly directional light type. Wherein, a light beam transmission range of the infrared light source 111 can be greater than a light beam transmission range of the infrared light source 112.

The image capturer 120 can be an infrared camera with infrared image capturing capability. When the image capturer 120 performs the image capturing operation, the infrared light sources 111, 112 can be turned on to provide the light required for the image capturing operation. The image capturer 120 can perform a detecting operation of the light intensity of the shooting scene and thereby obtain light intensity information. On the other hand, the image capturer 120 can also set an exposure setting time during the image capturing operation according to the detected light intensity information. Wherein, when the shooting scene has relatively high light intensity information, the image capturer 120 can set a relatively low exposure setting time. when the shooting scene has relatively low light intensity information, the image capturer 120 can set a relatively high exposure setting time.

In addition, the controller 130 is coupled to the infrared light sources 111, 112 and the image capturer 120. The controller 130 can receive the light intensity information obtained by the image capturer 120, and control the on or off state of the infrared light sources 111, 112 according to the light intensity information. In details, when the image capturing device 100 is to perform the image capturing operation, the controller 130 can first turn on the infrared light source 111 and enable the infrared light source 111 to provide an illumination light beam. Then, the controller 130 can receive the light intensity information and compare the light intensity information with a preset first threshold. When the light intensity information is not greater than the preset first threshold, the controller 130 may determine that the light intensity of the infrared light in the shooting scene is insufficient, and correspondingly turn on the infrared light source 112. Herein, based on the infrared light source 112 being the light source with highly directional light type, the fill light operation can be effectively performed on a specific area of the image shooting scene of the image capturer 120. Thereby, the image capturer 120 can obtain a relatively high-definition captured image.

On the contrary, if the infrared light source 111 is turned on and the infrared light source 112 is turned off, when the controller 130 determines that the light intensity information is not greater than the preset first threshold, the infrared light source 111 can be maintained in a state where the infrared light source 111 is turned on and the infrared light source 112 is turned off. And the image capturer 120 is enabled to capture the captured image and generate image information.

On the other hand, if the infrared light sources 111 and 112 are both turned on, the controller can further compare the light intensity information obtained by the image capturer 120 with a preset second threshold at this time, wherein the second threshold is greater than the first threshold. When the light intensity information is greater than the preset second threshold, the controller 130 may determine that the light intensity of the shooting scene at this time is too large. If the image capturing operation is performed, overexposure may occur. Therefore, correspondingly, the controller 130 can turn off the infrared light source 112, maintain the on state of the infrared light source 111, and then cause the image capturer 120 to perform the image capturing operation.

Figure 2A:
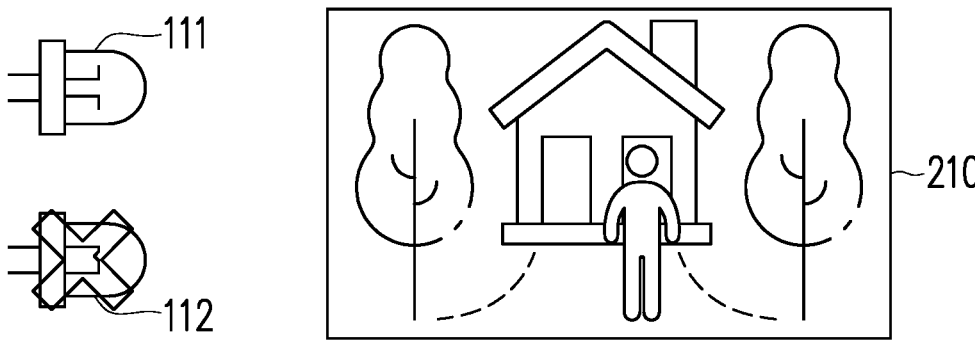
FIG. 2A and FIG. 2B are schematic diagrams of different implementations of the image capturing operation of the image capturing device according to the embodiment of the present invention.
Figure 2B:
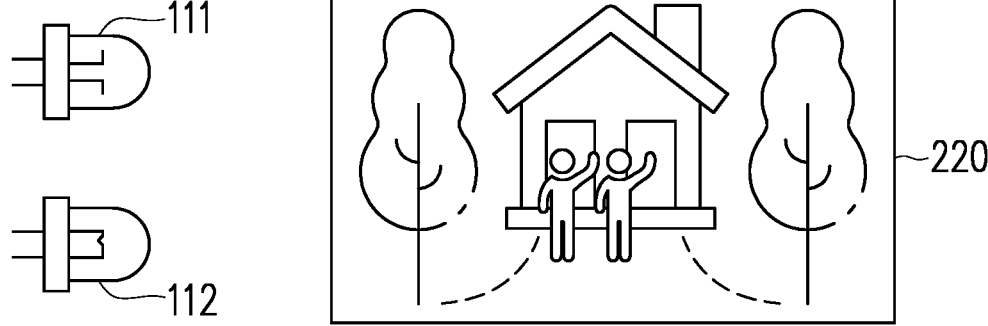

Referring to FIG. 1, FIG. 2A and FIG. 2B at the same time, FIG. 2A and FIG. 2B are schematic diagrams of different implementations of the image capturing operation of the image capturing device according to the embodiment of the present invention. In FIG. 2A, in a night vision mode, when performing the image capturing operation of the shooting scene with a wide field of view and a close-up view, the controller 130 can turn on the infrared light source 111 and turn off the infrared light source 112. Then, an illumination light beam of the wide-angle light type is provided through the infrared light source 111, so that the image capturer 120 can obtain clear image information 210.

In FIG. 2B, also in the night vision mode, when performing the image capturing operation of the shooting scene at a relatively long distance, the controller 130 can enable both the infrared light sources 111 and 112 to be turned on. In addition to providing the infrared illumination light beam of the wide-angle light type through the infrared light source 111, it also provides an infrared illumination light beam of the highly directional light type through the infrared light source 112 to supplement the infrared illumination brightness required for objects with relatively long distances, so that the image capturer 120 can obtain clear image information 220.

Referring FIG. 1 again, in other embodiments of the present invention, the image capturing device 100 may also have three or more infrared light sources. Under such conditions, the controller 130 can preset multiple thresholds corresponding to the number of the infrared light sources. And by comparing the light intensity information with multiple thresholds, the range of the light intensity of the infrared light in the shooting scene is determined, and the number of infrared light sources to be turned on is determined. It should be noted that, regardless of the size of the light intensity information, the infrared light source 111 is always turned on during the image capturing operation.

Incidentally, the controller 130 can be built in the image capturer 120 or set outside the image capturer 120. In addition, the controller 130 can be a processor with computing capabilities. Alternatively, the controller 130 can be designed through Hardware Description Language (HDL) or any other digital circuit design method that is well known to those skilled in the art. And the controller 130 is a hardware circuit implemented through Field Programmable Gate Array (FPGA), Complex Programmable Logic Device (CPLD) or Application-specific Integrated Circuit (ASIC).

Figure 3:
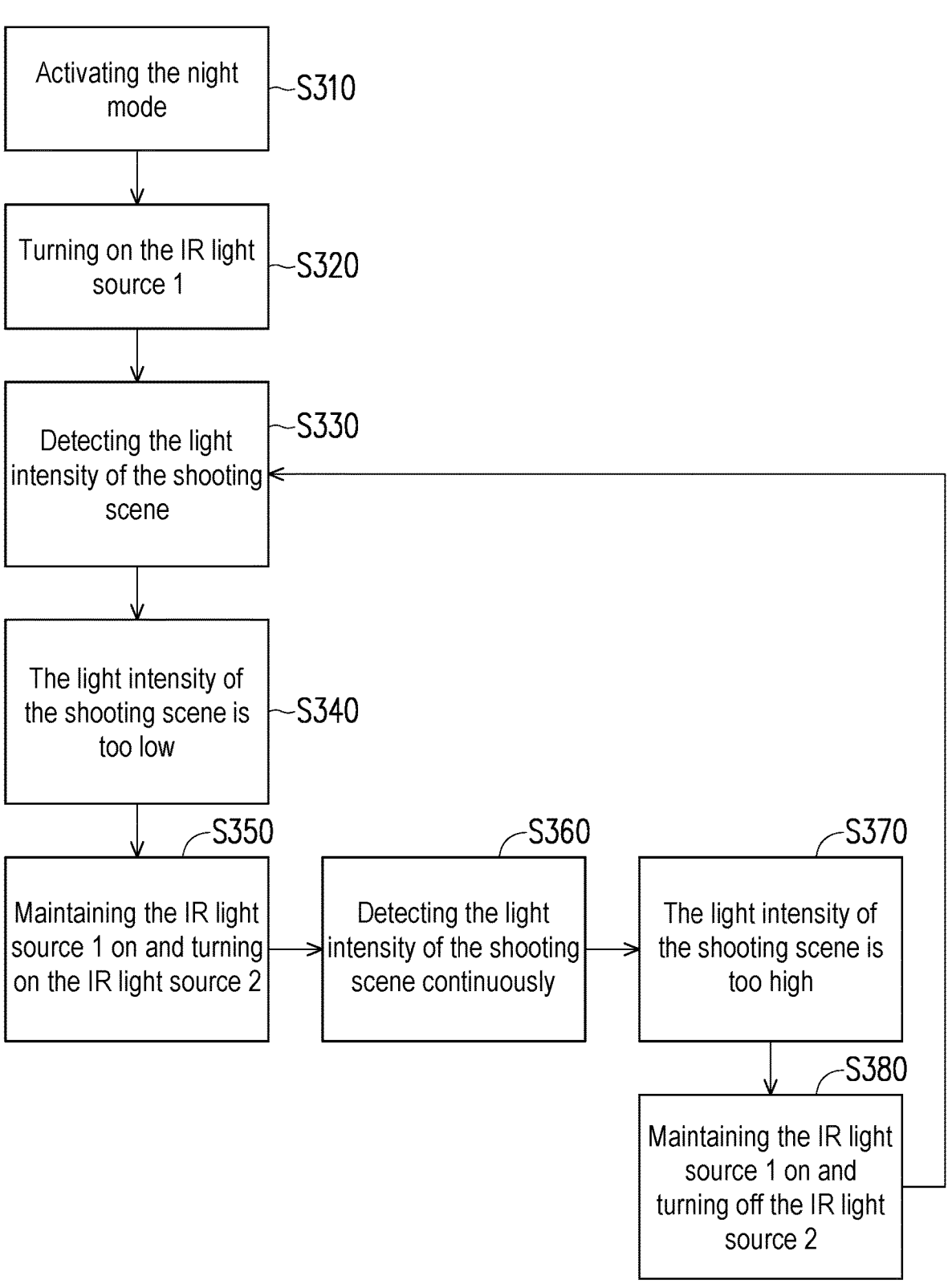
FIG. 3 is a flow chart of an image capturing method of the image capturing device according to the embodiment of the present invention.

Referring to FIG. 3, FIG. 3 is a flow chart of an image capturing method of the image capturing device according to the embodiment of the present invention. In step S310, the night mode of the image capturing device can be activated. In step S320, an infrared light (IR) light source 1 is turned on. Then, in step S330, the image capturing device can perform a detecting operation of the light intensity of the shooting scene to obtain the light intensity information. In step S340, the image capturing device can determine whether the light intensity of the shooting scene is too low according to the light intensity information. And when the image capturing device determines that the light intensity of the shooting scene is too low, step S350 is executed to turn on an IR light source 2 while maintaining the IR light source 1 being turned on. Wherein, in step S340, the image capturing device can determine whether the light intensity of the shooting scene is too low according to whether the light intensity information is not greater than a preset threshold. Also, the IR light source 1 and the IR light source 2 can have different light types respectively.

In step S360, the image capturing device can continuously detect the light intensity of the shooting scene and obtain dynamically changing light intensity information. In step S370, if the image capturing device determines that the light intensity of the shooting scene is too high, in step S380, the IR light source 2 can be turned off while maintaining the IR light source 1 on. Wherein, in step S370, the image capturing device can determine whether the light intensity of the shooting scene is too high according to whether the light intensity information is greater than another preset threshold. The preset threshold in step S340 can be smaller than another threshold in step S370.

It is worth mentioning that, the above threshold can be set by the designer based on the minimum exposure intensity required by the image capturing device and the maximum exposure intensity acceptable by the image capturing device. Wherein, the relatively low threshold is used to ensure that the image capturing device can capture images at infrared light intensity above the minimum exposure intensity. The relatively high threshold is used to ensure that the image capturing device does not cause overexposure when performing the image capturing operation.

Figure 4:
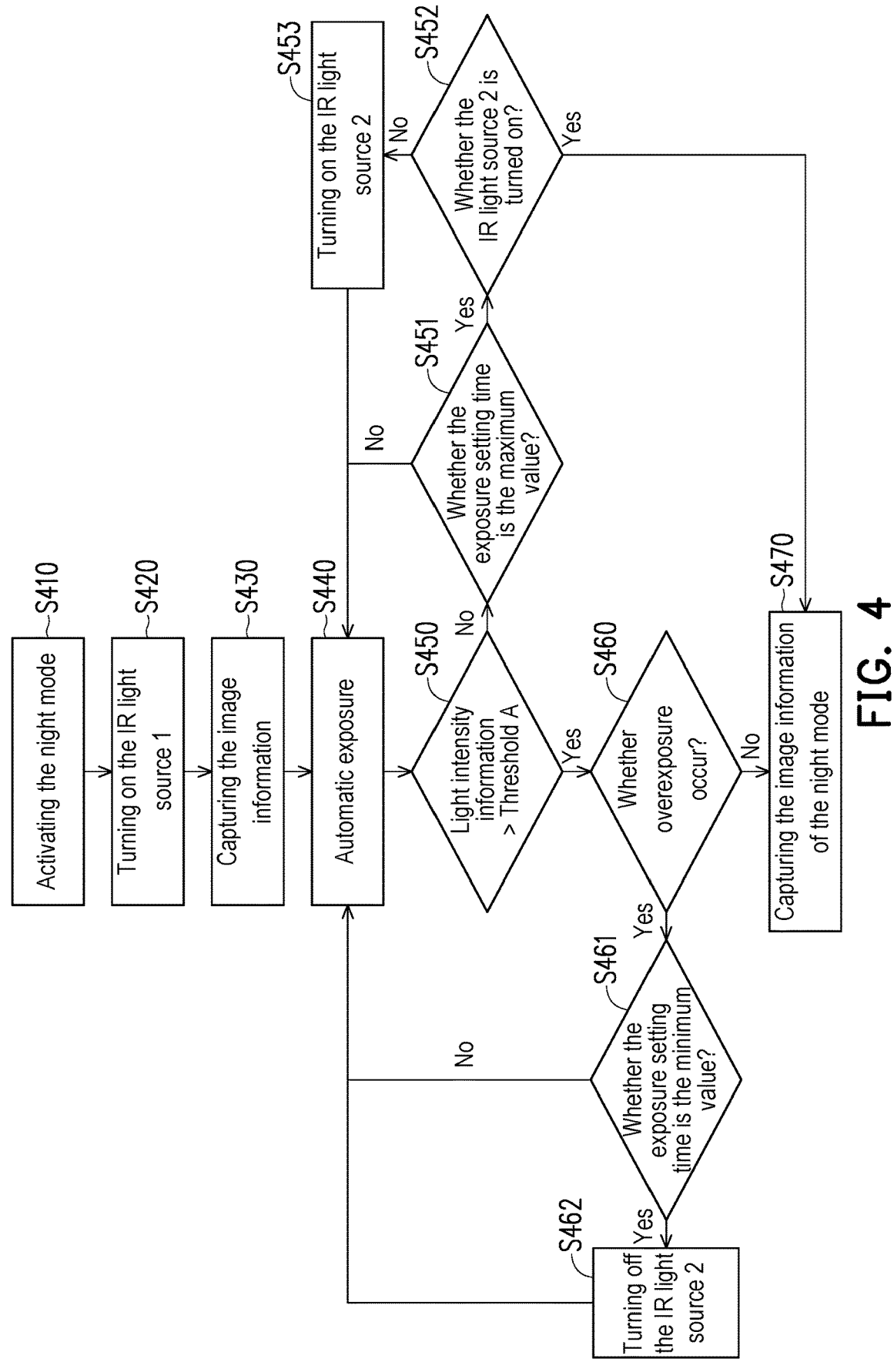
FIG. 4 is a flow chart of another implementation of the image capturing method of the image capturing device according to the embodiment of the present invention.

Referring to FIG. 4, FIG. 4 is a flow chart of another implementation of the image capturing method of the image capturing device according to the embodiment of the present invention. Wherein, in step S410, the night mode of the image capturing device can be activated. In step S420, an infrared light (IR) light source 1 is turned on. Then, in step S430, the image capturing device can perform a capturing operation of the image information. In step S440, the image capturing device can perform automatic exposure operations. In step S450, the image capturing device can detect the light intensity information of the shooting scene and determine whether the light intensity information is greater than a threshold A. In step S450, if the image capturing device determines that the light intensity information is not greater than the threshold A, step S451 can be executed. On the contrary, in step S450, if the image capturing device determines that the light intensity information is greater than the threshold A, step S460 can be executed.

In step S451, the image capturing device can further determine whether the exposure setting time at this time is a maximum value. If the exposure setting time of the image capturing device is the maximum value at this time, step S452 can be executed to determine whether an IR light source 2 has been turned on. If the IR light source 2 is turned on, the image capturing device can capture the image information of the night mode through step S470. On the contrary, in step S452, if the image capturing device determines that the IR light source 2 is not turned on, the image capturing device can execute step S453 to turn on the IR light source 2 and return to step S440.

It should be noted that, the image capturing device can adjust the exposure setting time according to the current light intensity of the shooting scene. When the light intensity is relatively low, the image capturing device can increase the exposure setting time to increase the exposure during image capturing. On the contrary, when the light intensity is relatively high, the image capturing device can decrease the exposure setting time to increase the exposure during image capturing.

On the contrary, in step S451, if the exposure setting time of the image capturing device is not the maximum value at this time, then the process can return to step S440.

In step S460, the image capturing device can determine whether overexposure may occur by determining whether the light intensity of the shooting scene is too high at this time. In step S460, if the image capturing device determines that overexposure may not occur, step S470 can be performed to capture the image information of the night mode. On the contrary, in step S460, if the image capturing device determines that overexposure may occur, step S461 can be performed.

In step S461, the image capturing device can further determine whether the exposure setting time is the minimum value at this time. If the determination result is Yes, the IR light source 2 can be turned off. On the contrary, if the determination result of step S461 is No, then the process can return to step S440.

Referring to FIG. 5, FIG. 5 is a flow chart of an image capturing method according to another embodiment of the present invention. Wherein, in step S510, a plurality of infrared light sources are provided, wherein the infrared light sources respectively have different light types. In step S520, an image capturer is provided to capture image information. In step S530, a controller is provided to turn on or turn off each of the infrared light sources according to light intensity information, wherein at least one of the infrared light sources is turned on during an image capturing operation.

Regarding the implementation details of the above steps S510~S530, these steps have been described in detail in the foregoing embodiments and implementations, and will not be repeated here.

In summary, the image capturing device of the present invention controls the infrared light sources to be turned on according to the light intensity of the shooting scene. In this way, the image capturing device can dynamically adjust the on or off status of the infrared light sources with different light types according to the actual conditions of the shooting scene, which can effectively improve the quality of the captured images.

What is claimed is:

1. An image capturing device, comprising:
a plurality of infrared light sources, respectively have a plurality of light types, wherein the infrared light sources comprise a first infrared light source and a second infrared light source, and the first light source and the second light source have different light types;
an image capturer, configured to capture image information, wherein the image capturer is configured to sense light intensity information; and
a controller, coupled to the infrared light sources and the image capturer, the controller turns on or turns off each of the infrared light sources according to the light intensity information, wherein at least one of the infrared light sources is turned on during an image capturing operation,
wherein the controller is configured to:
turn on the first infrared light source;
determine whether the light intensity information is less than a first threshold after the first infrared light source is turned on;
determine whether an exposure setting time of the image capturing device is a maximum value in response to determining that the light intensity information is less than the first threshold; and
in response to determining that the exposure setting time is the maximum value, turn on the second light source while maintaining the first light source on.

2. The image capturing device according to claim 1, wherein the infrared light sources have different light beam transmission ranges.

3. The image capturing device according to claim 2, wherein a light beam transmission range of the first infrared light source is greater than a light beam transmission range of the second infrared light source.

4. The image capturing device according to claim 1, wherein the controller is further configured to:
when the light intensity information is not less than the first threshold, determining whether the light intensity information is greater than a second threshold; and
when the light intensity information is not greater than the second threshold, enabling the image capturer to capture the image information,
wherein the first threshold is less than the second threshold.

5. The image capturing device according to claim 4, wherein the controller is further configured to:
when the light intensity information is greater than the second threshold, turning off the second infrared light source.

6. An image capturing method, comprising:
providing a plurality of infrared light sources, wherein the infrared light sources respectively have a plurality of light types, wherein the infrared light sources comprise a first infrared light source and a second infrared light source, and the first light source and the second light source have different light types;
providing an image capturer to capture image information, wherein the image capturer is configured to sense light intensity information;
providing a controller to turn on or turn off each of the infrared light sources according to the light intensity information, wherein at least one of the infrared light sources is turned on during an image capturing operation;

turning on the first infrared light source;

determining whether the light intensity information is less than a first threshold after the first infrared light source is turned on; and determining whether an exposure setting time of the image capturing device is a maximum value in response to determining that the light intensity information is less than the first threshold; and in response to determining that the exposure setting time is the maximum value, turning on the second light source while maintaining the first light source on.

7. The image capturing method according to claim 6, wherein the infrared light sources have different light beam transmission ranges.

8. The image capturing method according to claim 6, wherein a light beam transmission range of the first infrared light source is greater than a light beam transmission range of the second infrared light source.

9. The image capturing method according to claim 6, further comprises:

when the light intensity information is not less than the first threshold, determining whether the light intensity information is greater than a second threshold; and when the light intensity information is not greater than the second threshold, enabling the image capturer to capture the image information, wherein the first threshold is less than the second threshold.

10. The image capturing method according to claim 9, further comprises:

when the light intensity information is greater than the second threshold, turning off the second infrared light source.

* * * * *